US012700641B2

(12) United States Patent
Kim et al.

(10) Patent No.: US 12,700,641 B2
(45) Date of Patent: Aug. 4, 2026

(54) UNDERBODY FOR ELECTRIC VEHICLES HAVING WATER TANK

(71) Applicant: LG ENERGY SOLUTION, LTD., Seoul (KR)

(72) Inventors: Kyung Woo Kim, Daejeon (KR); Jeong Oh Moon, Daejeon (KR); Young Bum Cho, Daejeon (KR); Hyeon Ki Yun, Daejeon (KR); Jhin Ha Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 689 days.

(21) Appl. No.: 18/015,656

(22) PCT Filed: Feb. 4, 2022

(86) PCT No.: PCT/KR2022/001784
§ 371 (c)(1),
(2) Date: Jan. 11, 2023

(87) PCT Pub. No.: WO2022/177210
PCT Pub. Date: Aug. 25, 2022

(65) Prior Publication Data
US 2023/0253674 A1     Aug. 10, 2023

(30) Foreign Application Priority Data

| Feb. 19, 2021 | (KR) | .......................... | 10-2021-0022219 |
| Feb. 19, 2021 | (KR) | .......................... | 10-2021-0022220 |
| Jan. 11, 2022 | (KR) | .......................... | 10-2022-0004292 |

(51) Int. Cl.
*H01M 2/12* (2006.01)
*A62C 3/07* (2006.01)
(Continued)

(52) U.S. Cl.
CPC ............. *H01M 50/383* (2021.01); *A62C 3/07* (2013.01); *A62C 3/16* (2013.01); *A62C 35/10* (2013.01);
(Continued)

(58) Field of Classification Search
CPC ............. H01M 50/383; H01M 50/375; H01M 50/367; H01M 50/249; H01M 50/262;
(Continued)

(56) References Cited

U.S. PATENT DOCUMENTS

| 9,054,402 B1 | 6/2015 | Rawlinson |
| 2011/0059345 A1 | 3/2011 | Kim et al. |

(Continued)

FOREIGN PATENT DOCUMENTS

| CN | 111312944 A | 6/2020 |
| CN | 212085172 U | 12/2020 |

(Continued)

OTHER PUBLICATIONS (Abstract of JP-2012252909) Takahata et al, "Battery Pack Used In Motor Vehicle E.g. Electric Vehicle, Has Fire Extinguisher Injection Unit That Injects Fire Extinguisher In Inner Side Main Portion, When Generated Cell Heat Is Greater Than Upper Limit Temperature", Dec. 20, 2012. (Year: 2012).*

(Continued)

*Primary Examiner* — Raymond Alejandro
(74) *Attorney, Agent, or Firm* — Birch, Stewart, Kolasch & Birch, LLP

(57) ABSTRACT

An underbody for electric vehicles can include a receiving portion depressed upwards by a predetermined depth. The receiving portion can be configured to receive a battery pack. A first water tank can be mounted in an upper part of the receiving portion. The first water tank can include an upper body, a lower body provided with a through-hole (Continued)

having a predetermined shape, and a sealing member provided in the through-hole and in direct contact with the lower body.

16 Claims, 13 Drawing Sheets

(51) Int. Cl.

| | | |
|---|---|---|
| *A62C 3/16* | (2006.01) |
| *A62C 35/10* | (2006.01) |
| *B60K 1/04* | (2019.01) |
| *B60K 11/02* | (2006.01) |
| *H01M 10/625* | (2014.01) |
| *H01M 10/653* | (2014.01) |
| *H01M 10/6567* | (2014.01) |
| *H01M 50/242* | (2021.01) |
| *H01M 50/249* | (2021.01) |
| *H01M 50/262* | (2021.01) |
| *H01M 50/271* | (2021.01) |
| *H01M 50/383* | (2021.01) |
| *B60K 1/00* | (2006.01) |
| *B62D 25/20* | (2006.01) |

(52) U.S. Cl.
  CPC ............... *B60K 1/04* (2013.01); *B60K 11/02* (2013.01); *H01M 10/625* (2015.04); *H01M 10/653* (2015.04); *H01M 10/6567* (2015.04); *H01M 50/242* (2021.01); *H01M 50/249* (2021.01); *H01M 50/262* (2021.01); *H01M 50/271* (2021.01); *B60K 2001/005* (2013.01); *B60K 2001/0438* (2013.01); *B62D 25/20* (2013.01); *H01M 2220/20* (2013.01)

(58) Field of Classification Search
  CPC ............. H01M 50/242; H01M 50/271; H01M 10/625; H01M 10/613; H01M 10/653; H01M 10/655; H01M 10/6556; H01M 10/6567; H01M 2220/20; A62C 3/07; A62C 3/16; A62C 3/10; A62C 35/10; B60K 1/04; B60K 11/02; B60K 2001/005; B60K 2001/0438; B62D 25/20
  See application file for complete search history.

(56) References Cited

U.S. PATENT DOCUMENTS

| | | | |
|---|---|---|---|
| 2011/0059347 A1 | 3/2011 | Lee et al. |
| 2012/0055725 A1 | 3/2012 | Mizoguchi et al. |
| 2013/0075116 A1 | 3/2013 | Lim et al. |
| 2014/0186668 A1 | 7/2014 | Jung et al. |
| 2017/0165513 A1 | 6/2017 | Li |
| 2018/0154940 A1 | 6/2018 | Fritz et al. |
| 2020/0076019 A1 | 3/2020 | Ohkuma |
| 2020/0180442 A1 | 6/2020 | Rabe et al. |
| 2020/0406973 A1 | 12/2020 | Nagaya et al. |
| 2021/0050635 A1 | 2/2021 | Lee et al. |
| 2022/0294052 A1 | 9/2022 | Kwon et al. |
| 2022/0314772 A1 | 10/2022 | Kim et al. |

FOREIGN PATENT DOCUMENTS

| | | | | | |
|---|---|---|---|---|---|
| EP | 3 984 865 A1 | | 4/2022 | | |
| JP | 2009-87774 A | | 4/2009 | | |
| JP | 2012-138205 A | | 7/2012 | | |
| JP | 2012252909 A | * | 12/2012 | .............. | H01M 2/10 |
| JP | 2013-135720 A | | 7/2013 | | |
| JP | 2018-90246 A | | 6/2018 | | |
| KR | 10-2012-0015446 A | | 2/2012 | | |
| KR | 10-2013-0028023 A | | 3/2013 | | |
| KR | 10-1294169 B1 | | 8/2013 | | |
| KR | 10-2020-0036640 A | | 4/2020 | | |
| KR | 10-2020-0104005 A | | 9/2020 | | |
| KR | 10-2021-0017172 A | | 2/2021 | | |
| WO | WO 2015/120742 A1 | | 8/2015 | | |
| WO | WO 2021/006560 A1 | | 1/2021 | | |

OTHER PUBLICATIONS

International Search Report (PCT/ISA/210) issued in PCT/KR2022/001784, dated May 4, 2022.
Extended European Search Report for European Application No. 22756411.9, dated Feb. 27, 2024.

* cited by examiner

【FIG. 1】 (CONVENTIONAL ART)
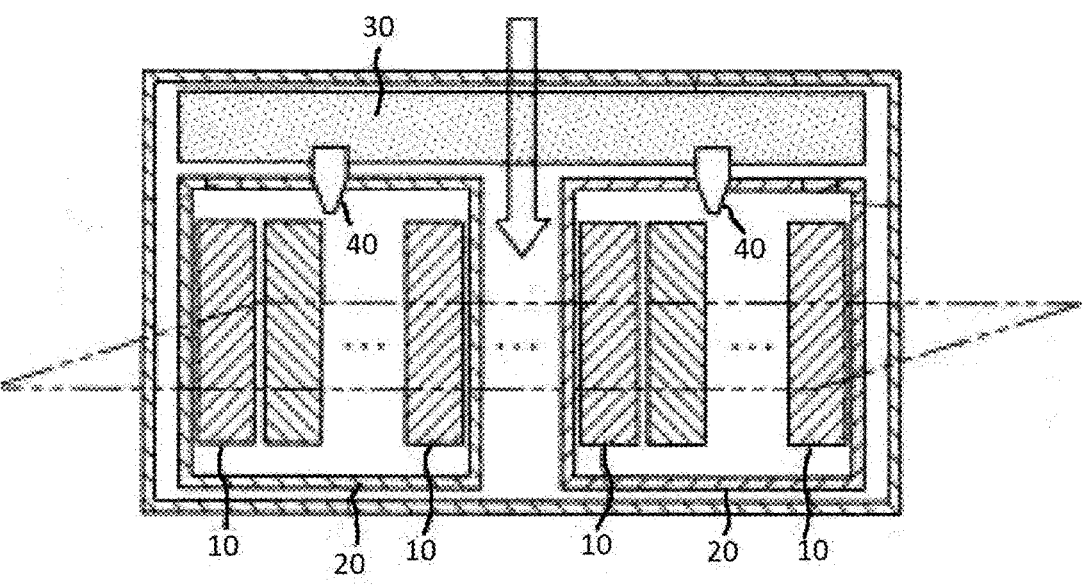
【FIG. 2】
100
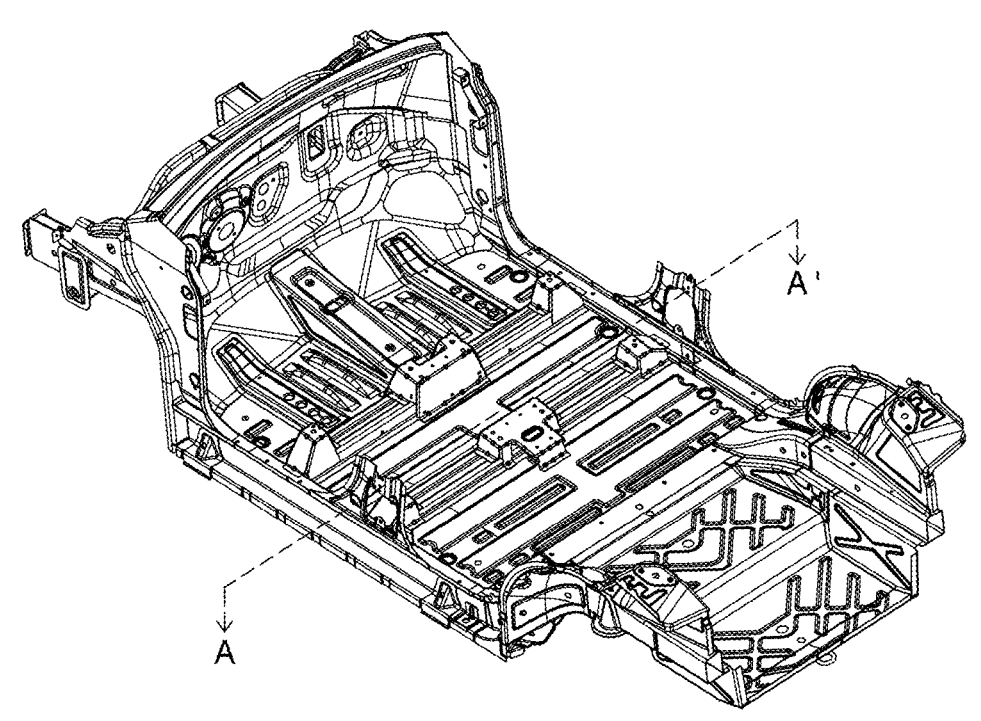

【FIG. 3】
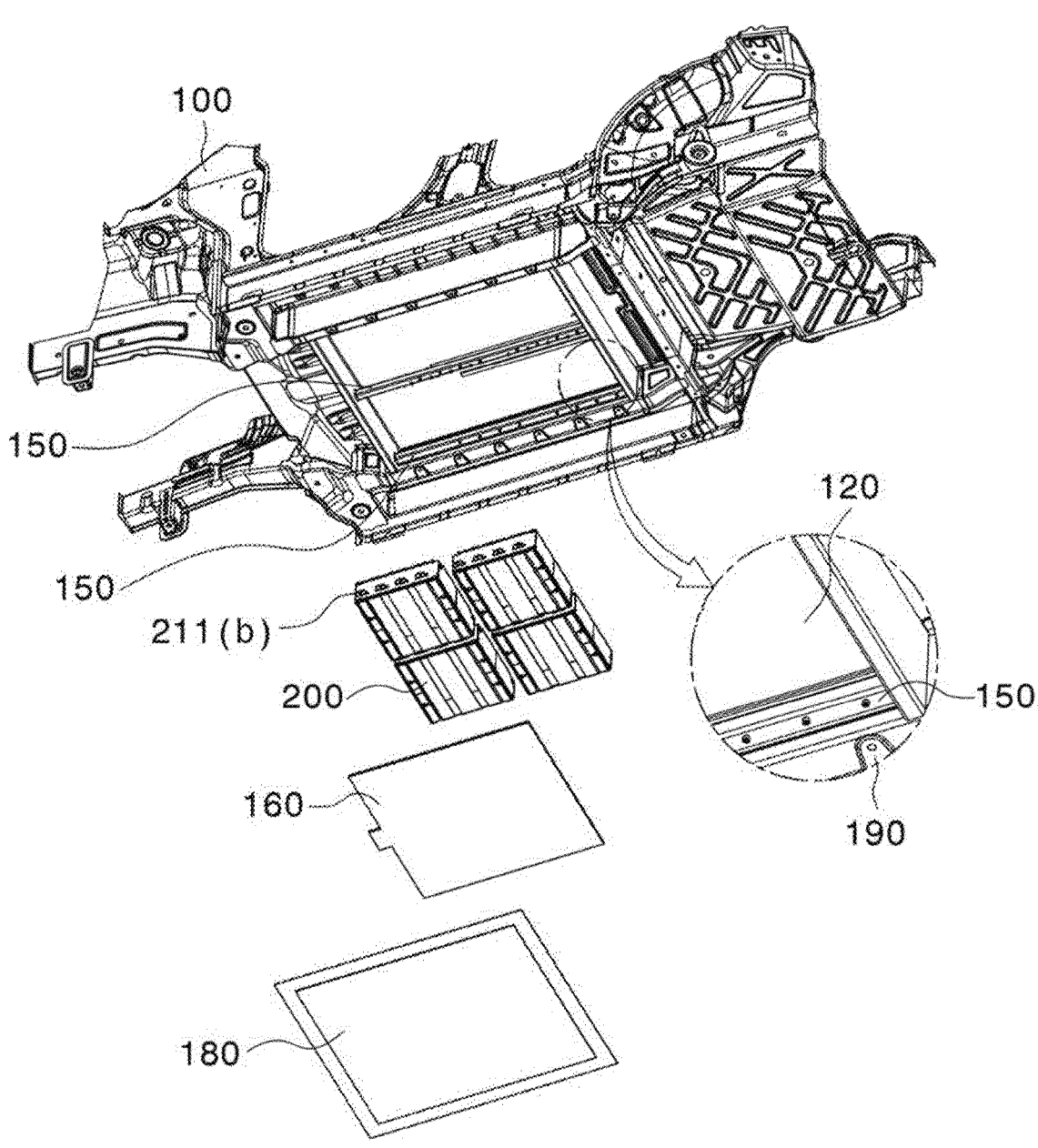

【FIG. 4】
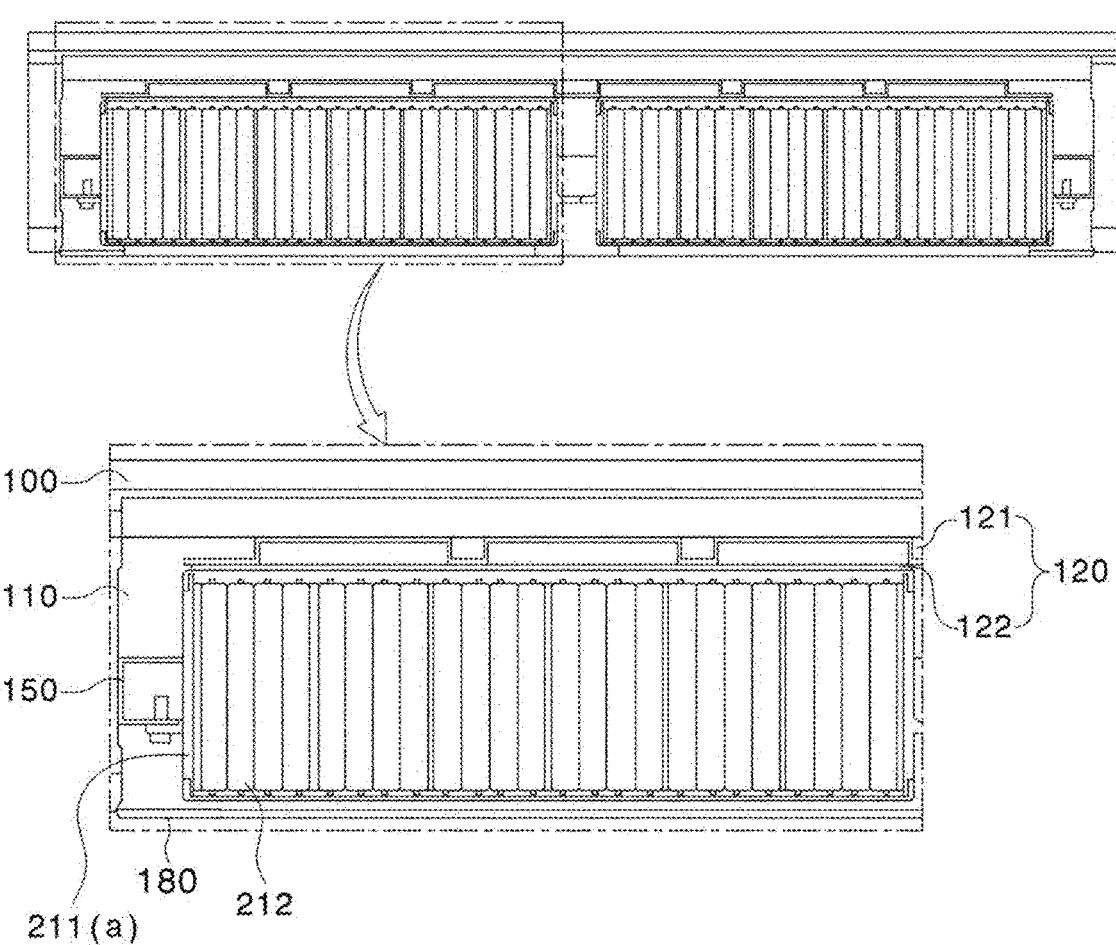

【FIG. 5】
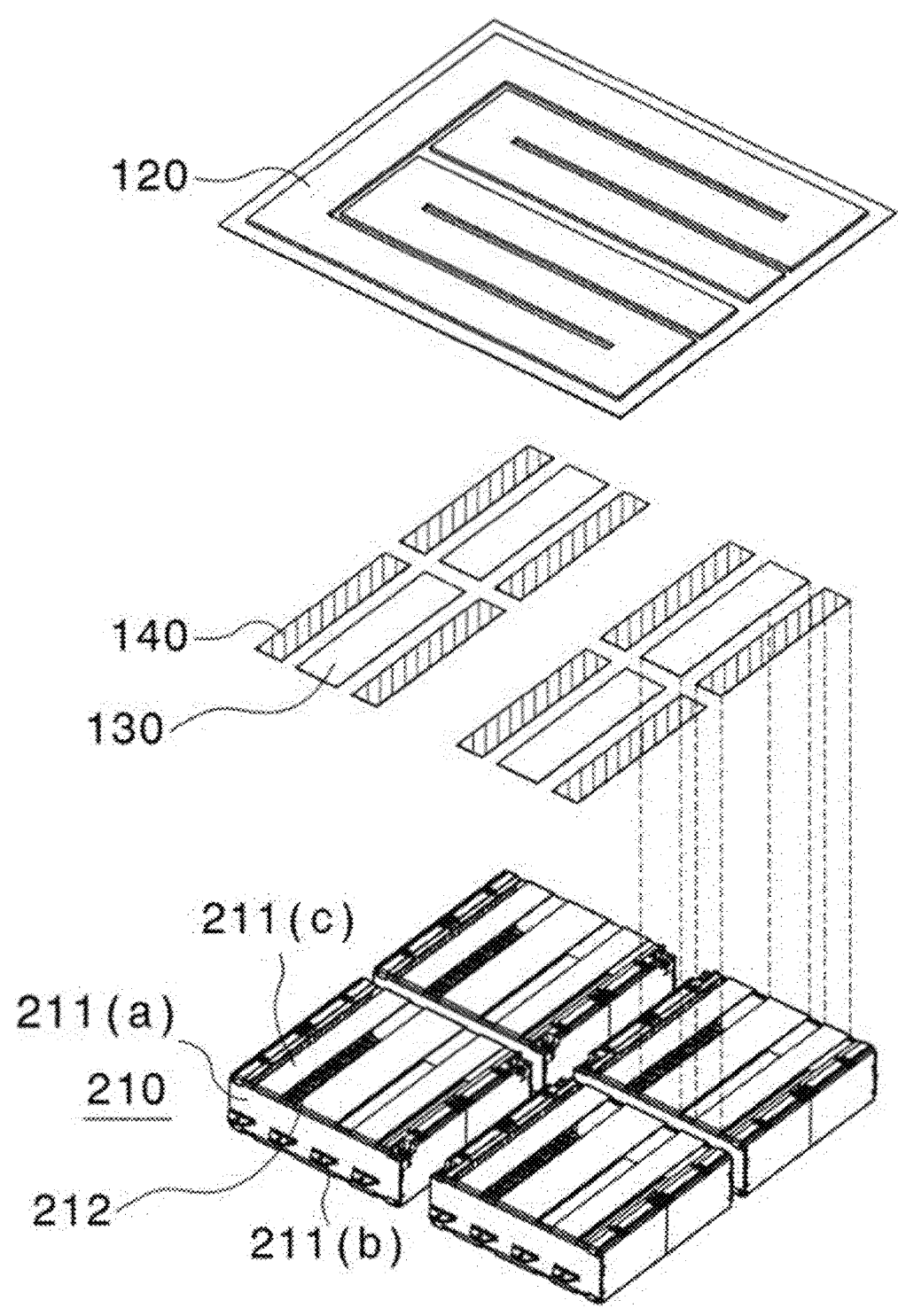

【FIG. 6】
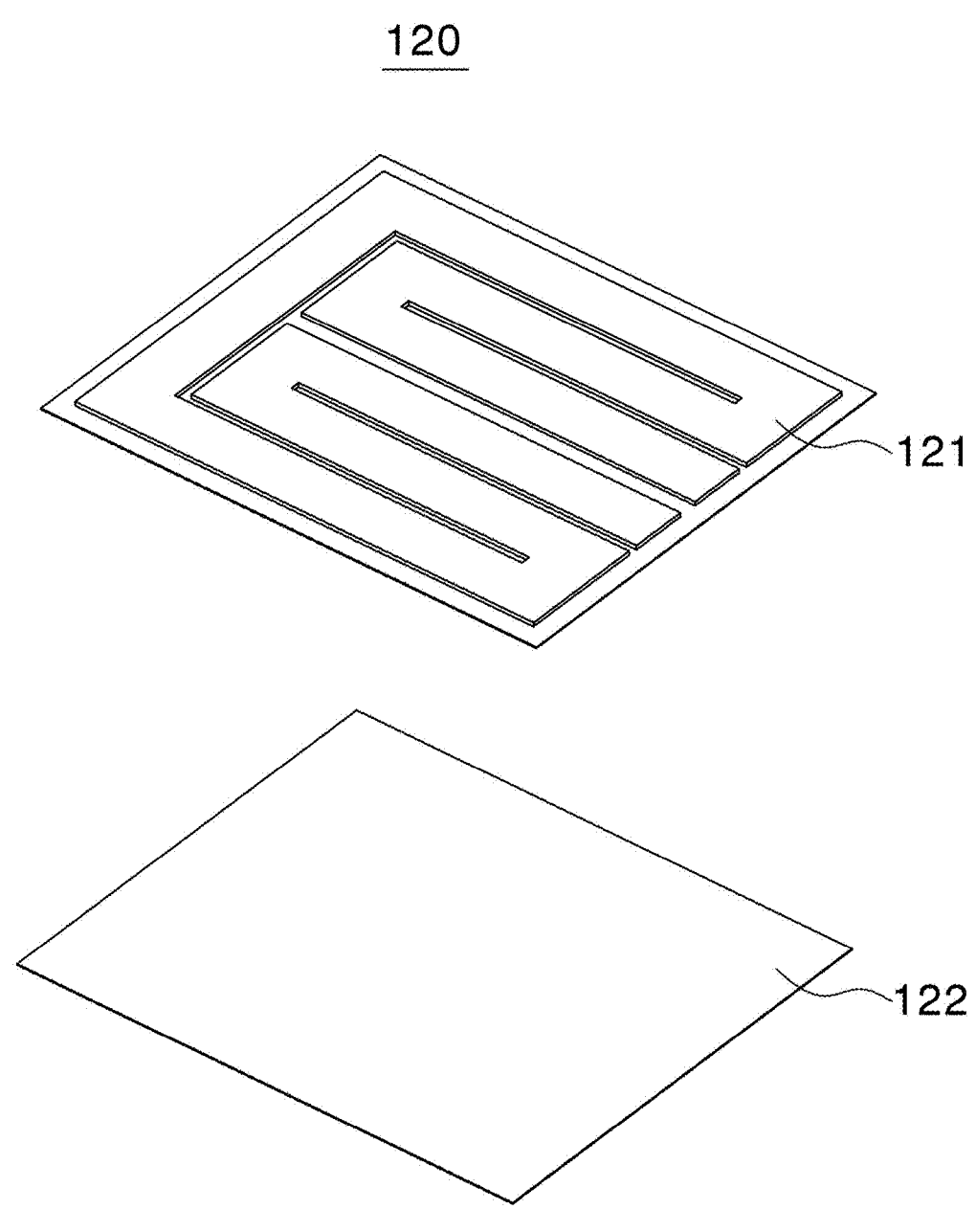

【FIG. 7】
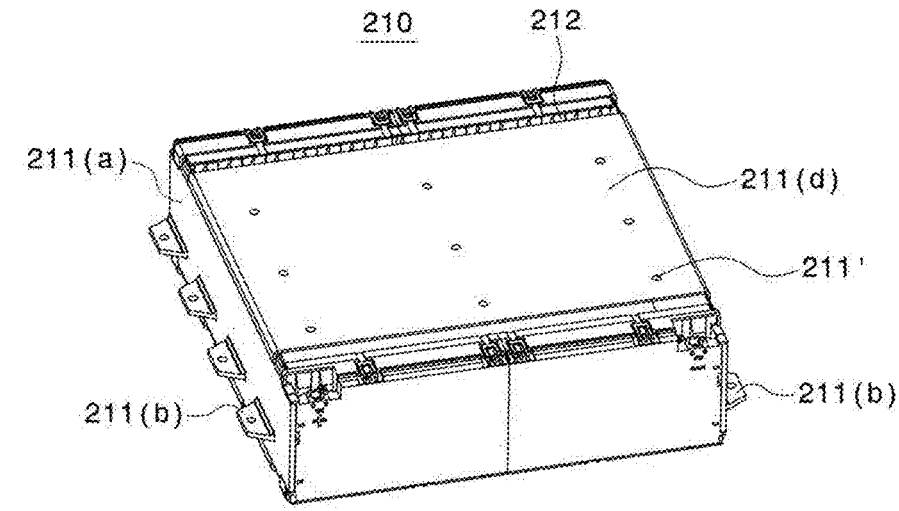
【FIG. 8】
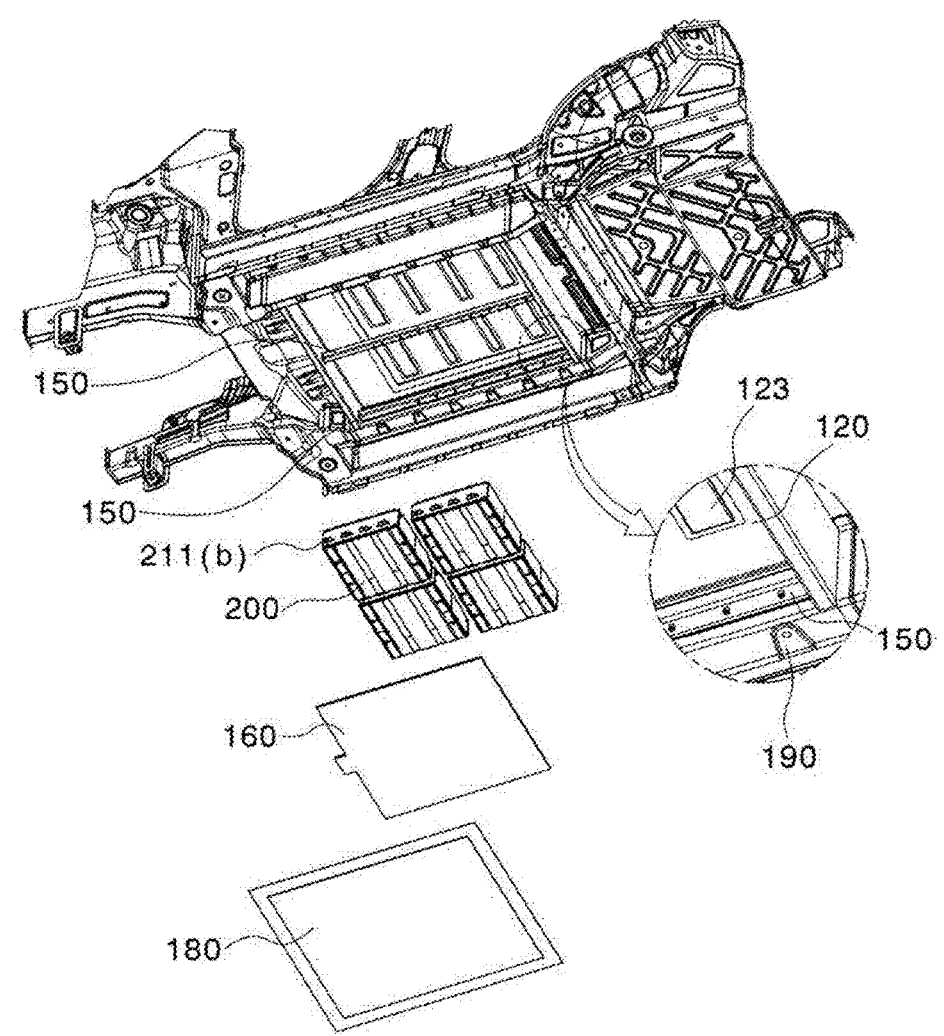

【FIG. 9】
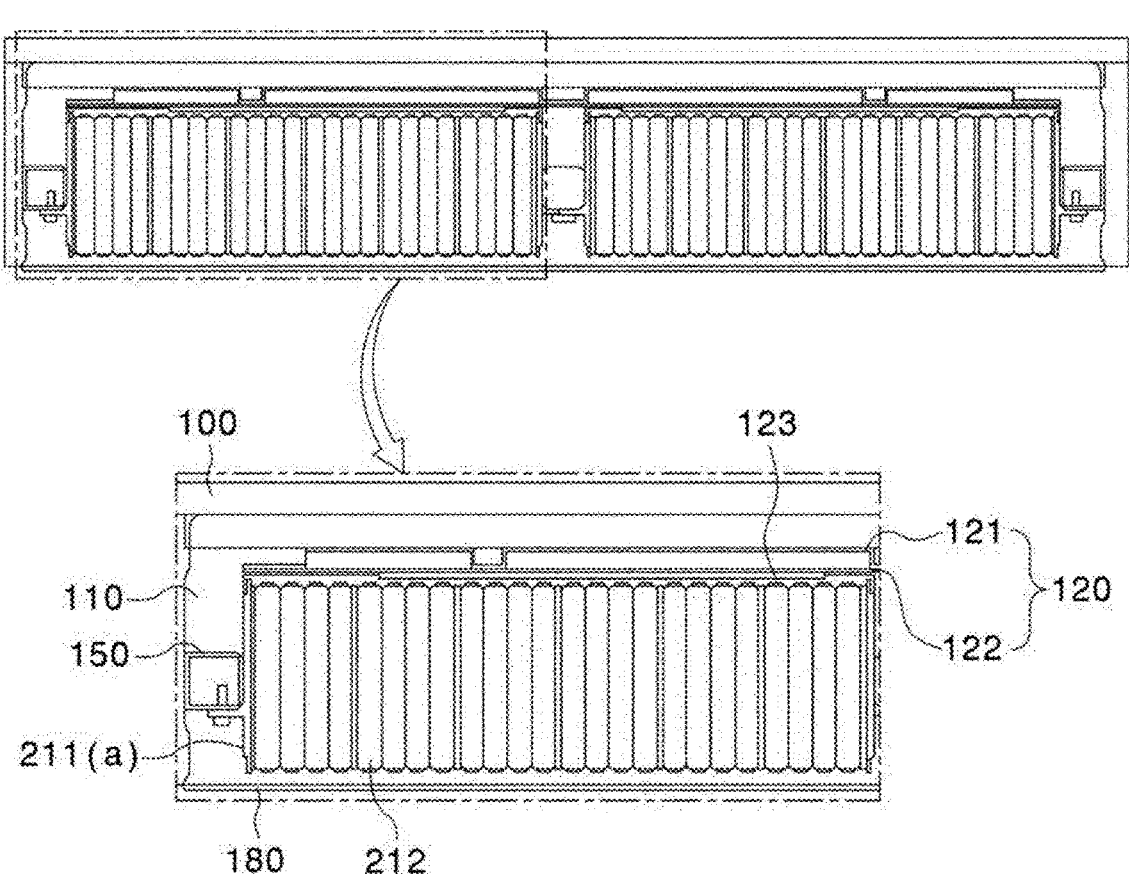

【FIG. 10】
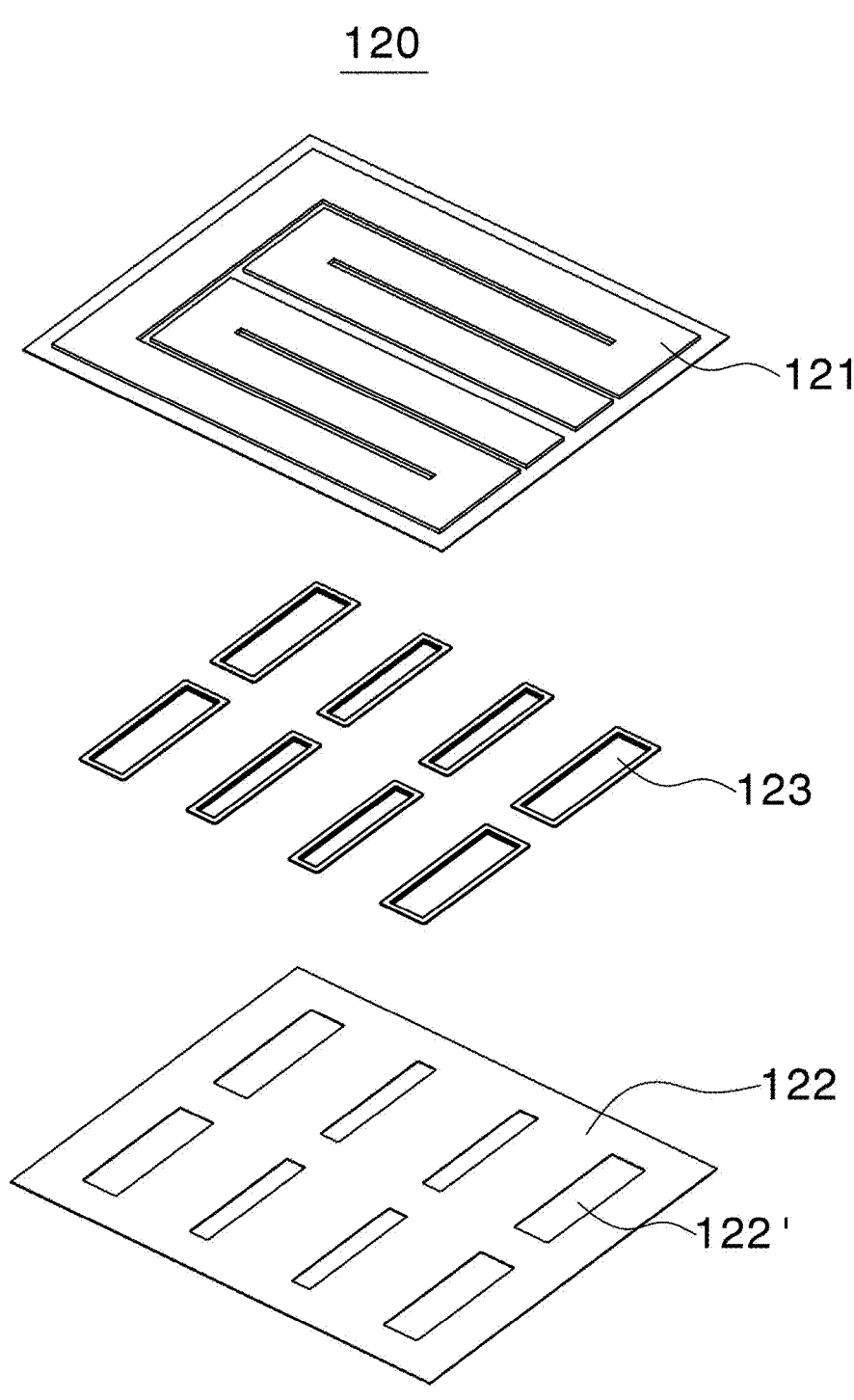

【FIG. 11】
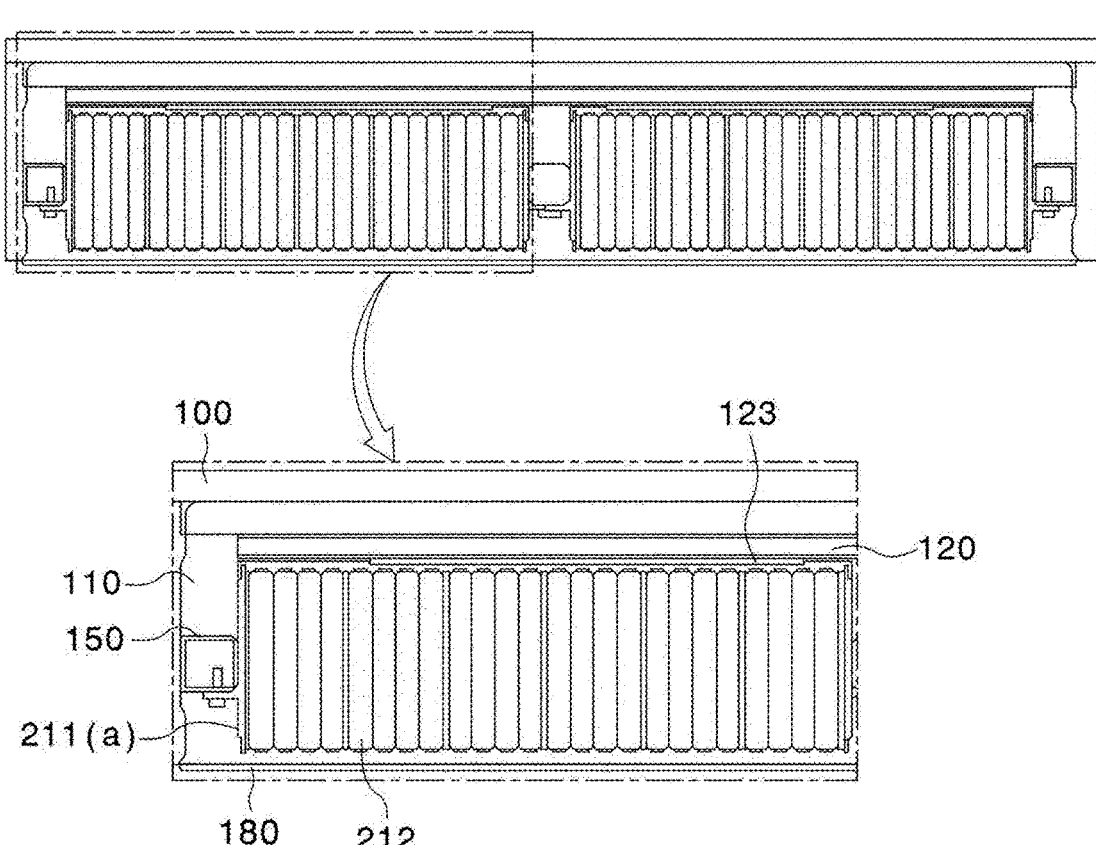

【FIG. 12】
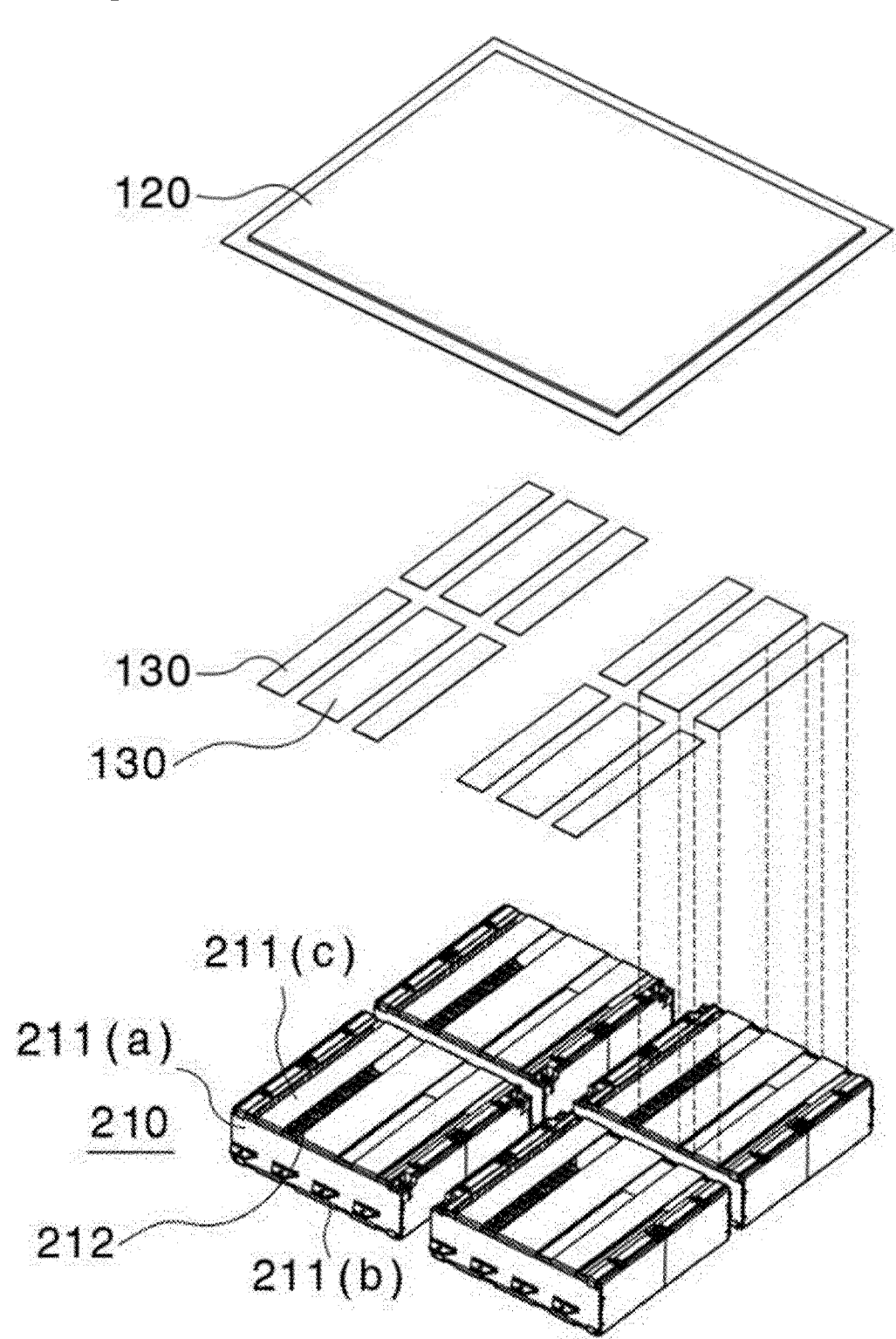

【FIG. 13】
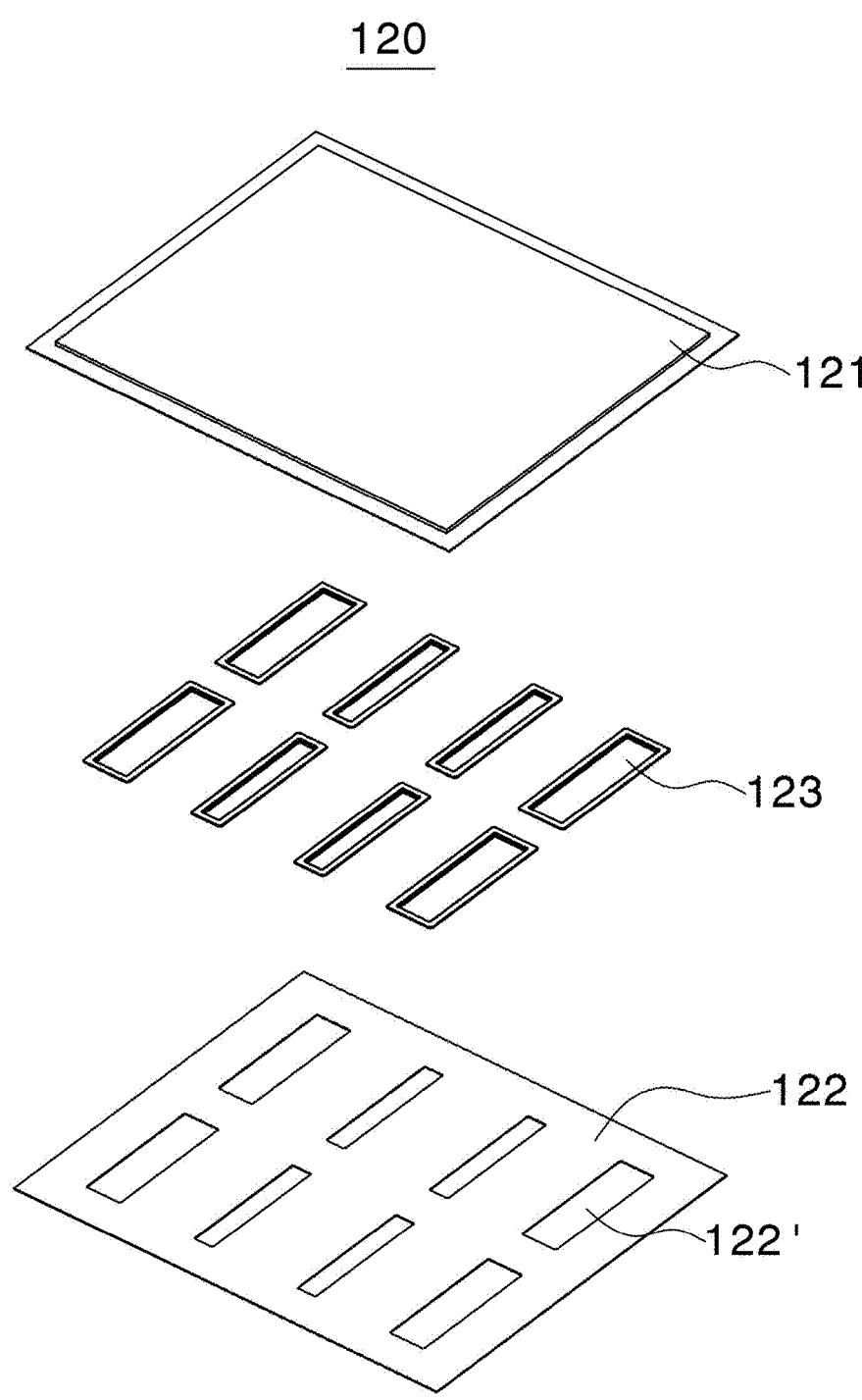

【FIG. 14】
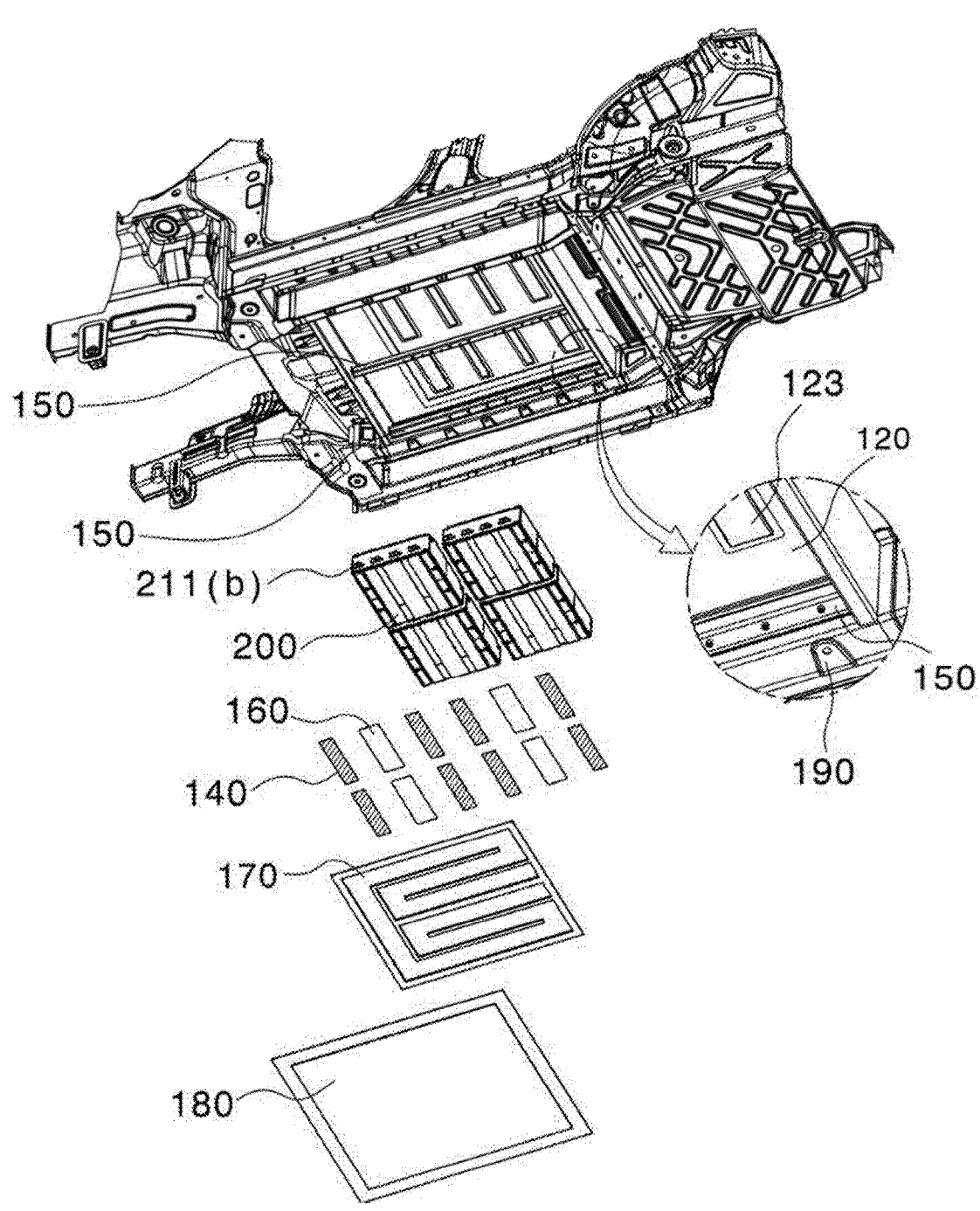

【FIG. 15】
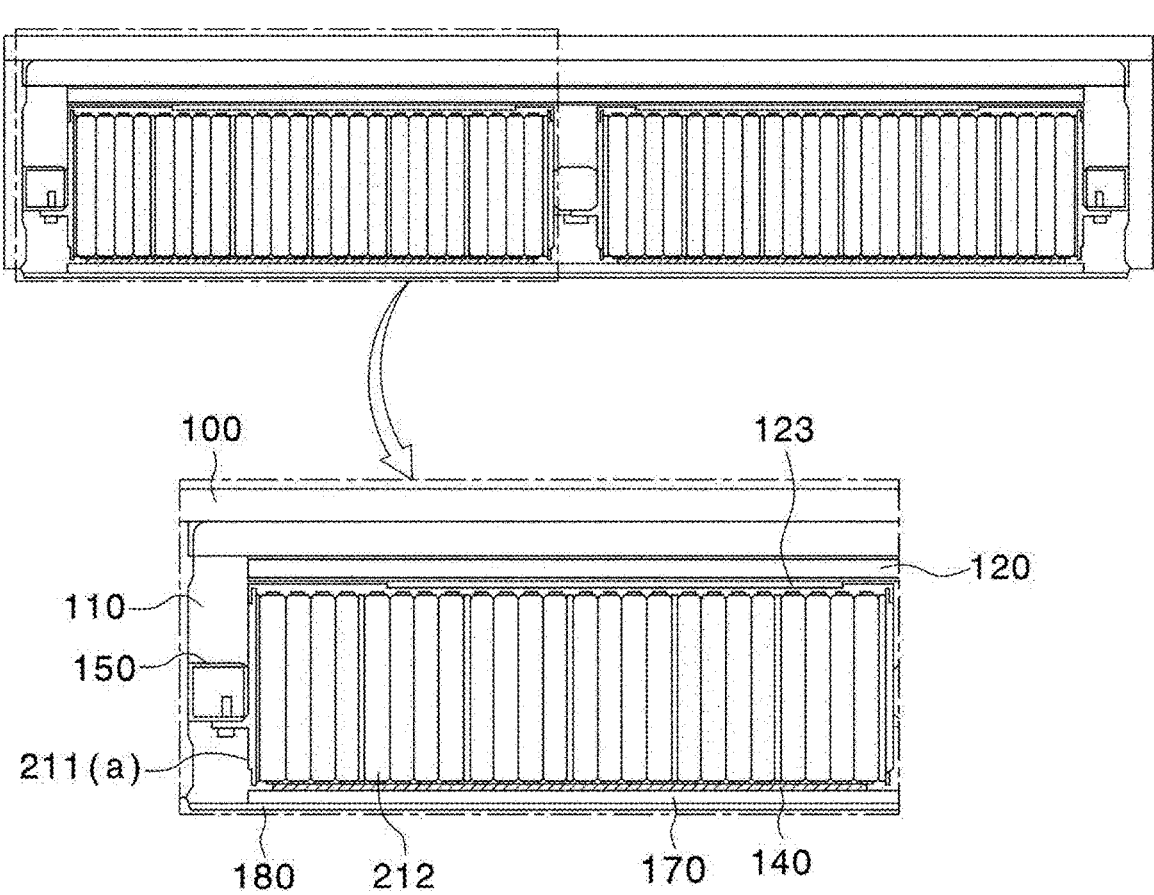

UNDERBODY FOR ELECTRIC VEHICLES HAVING WATER TANK

TECHNICAL FIELD

This application claims the benefit of priority to Korean Patent Application No. 2021-0022219 filed on Feb. 19, 2021, Korean Patent Application No. 2021-0022220 filed on Feb. 19, 2021, and Korean Patent Application No. 2022-0004292 filed on Jan. 11, 2022, the disclosures of which are incorporated herein by reference in their entireties.

The present invention relates to an underbody for electric vehicles having a water tank, and more particularly to an underbody for vehicles having a water tank, wherein the water tank is integrally mounted to the underbody in order to cool a battery pack in a normal state and to discharge water when fire breaks out in a battery, thereby preventing secondary damage.

BACKGROUND ART

With recent development of alternative energies due to air pollution and energy depletion caused as the result of use of fossil fuels, demand for secondary batteries capable of storing electrical energy that is produced has increased. The secondary batteries, which are capable of being charged and discharged, are intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

Meanwhile, when the secondary battery is used in a device that requires large capacity and high voltage, such as an electric vehicle, the secondary battery is used in the form of a battery module or a battery pack in which a plurality of battery cells is arranged.

For example, when a battery pack is mounted in an electric vehicle, the battery pack is received in a receiving space of an undercover of the vehicle. In general, a battery module, a thermally conductive film, and a heat sink may be received in that order, and a receiving portion is closed with a cover member.

Since the heat sink is located under the battery module, however, the heat sink must be separated first in order to replace or repair battery module or battery pack parts, and therefore a lot of labor is necessary.

Furthermore, heat is inevitably generated during charging and discharging of the secondary battery. Depending on circumstances, thermal runaway may occur due to short circuit, thermal impact, insulation breakdown, etc., which may lead to a great accident, such as outbreak of fire or explosion.

In connection therewith, FIG. 1 is a sectional view of a conventional battery pack. As shown in FIG. 1, the conventional battery pack includes a plurality of battery cells 10, a module case 20 configured to receive the plurality of battery cells 10, a fire extinguishing material tank 30 located at an upper surface of the module case 20, and a nozzle 40 located at a lower surface of the fire extinguishing material tank 30.

In the conventional battery pack, when fire breaks out in the battery cell, a lower stopper of the nozzle 40 is melted, whereby a fire extinguishing material is ejected from the fire extinguishing material tank 30 to extinguish the fire.

In the conventional battery pack, the nozzle 40 is required to extinguish fire, whereby the volume and weight of the battery pack are increased, and therefore energy density of the battery pack is decreased.

Furthermore, the conventional fire extinguishing material tank 30 stores only the fire extinguishing material, which is supplied when an event occurs, and therefore a heat sink must be further provided in order to dissipate heat generated in the battery pack.

PRIOR ART DOCUMENT (Patent Document 1) Japanese Patent Application Publication No. 2012-252909

DISCLOSURE

Technical Problem

The present invention has been made in view of the above problems, and it is an object of the present invention to provide an underbody for electric vehicles having a water tank configured to perform the function of a heat sink in a normal state and to be used for fire extinguishment when an event occurs in a battery cell.

It is another object of the present invention to provide an underbody for electric vehicles having a water tank configured to have a structure in which a battery pack is easily mounted or the battery pack is easily maintained.

Technical Solution

In order to accomplish the above objects, an underbody for electric vehicles according to the present invention includes a receiving portion depressed upwards by a predetermined depth, the receiving portion being configured to receive a battery pack, wherein a first water tank is mounted in an upper part of the receiving portion.

Also, in the underbody for electric vehicles according to the present invention, the first water tank may be integrally mounted to the underbody.

Also, in the underbody for electric vehicles according to the present invention, a battery pack including at least one battery module may be located under the first water tank.

Also, in the underbody for electric vehicles according to the present invention, the first water tank may include an upper body, a lower body provided with a through-hole having a predetermined shape, and a sealing member provided in the through-hole, and the sealing member may be made of includes a material configured to be melted or broken when heated to a predetermined temperature.

Also, in the underbody for electric vehicles according to the present invention, the at least one battery module may include a module case and at least one battery cell, and the module case may have a shape in which a part of the module case is open.

Also, in the underbody for electric vehicles according to the present invention, the module case may include a pair of side plates located respectively at opposite sides of a battery cell stack constituted by the at least one battery cell and at least one strap configured to fix the pair of side plates to each other, and each of the pair of side plates may be provided with a wing portion configured to be fixed to a predetermined region of the underbody by bolting or welding.

Alternatively, in the underbody for electric vehicles according to the present invention, the module case may include a pair of side plates located respectively at opposite sides of a battery cell stack constituted by the at least one battery cell and a lower plate and an upper plate configured to connect the pair of side plates to each other, each of the pair of side plates may be provided with a wing portion configured to be fixed to a predetermined region of the underbody by bolting or welding, and the upper plate may be provided with at least one through-hole.

Also, in the underbody for electric vehicles according to the present invention, a thermally conductive adhesive member may be located between the first water tank and the battery pack.

Also, in the underbody for electric vehicles according to the present invention, a first shock-absorbing pad may be located between the first water tank and the battery pack.

In addition, the underbody for electric vehicles according to the present invention may further include a cover member configured to open or close the receiving portion.

Also, in the underbody for electric vehicles according to the present invention, a second water tank may be located between the battery pack and the cover member.

Also, in the underbody for electric vehicles according to the present invention, a thermally conductive adhesive member may be located between the battery pack and the second water tank.

Also, in the underbody for electric vehicles according to the present invention, the second water tank may be a heat sink.

Also, in the underbody for electric vehicles according to the present invention, the first water tank may be a heat sink.

In addition, the present invention provides an electric vehicle including the underbody for vehicles.

Advantageous Effects

As is apparent from the above description, an underbody for electric vehicles having a water tank according to the present invention has both a function of cooling a battery pack and a fire extinguishment function, whereby it is possible to increase energy density.

Also, in the underbody for electric vehicles having the water tank according to the present invention, the water tank is integrally mounted to the underbody, whereby it is possible to omit a manufacturing process of mounting a heat sink to the underbody for vehicles.

Furthermore, in the underbody for electric vehicles having the water tank according to the present invention, the water tank is located above the battery pack, whereby it is possible to easily repair or replace electric parts of a battery module or the battery pack.

DESCRIPTION OF DRAWINGS

FIG. 1 is a sectional view of a conventional battery module.

FIG. 2 is a perspective view of an underbody for vehicles according to a first preferred embodiment of the present invention.

FIG. 3 is an exploded perspective view of the underbody for vehicles according to the first preferred embodiment of the present invention.

FIG. 4 is a sectional view taken along line A-A' of FIG. 2.

FIG. 5 is an exploded perspective view illustrating a coupling structure between a first water tank according to a first preferred embodiment of the present invention and a battery pack.

FIG. 6 is an exploded perspective view of the first water tank according to the first preferred embodiment of the present invention.

FIG. 7 is a perspective view of a modified battery module according to a first preferred embodiment of the present invention.

FIG. 8 is an exploded perspective view of an underbody for vehicles according to a second preferred embodiment of the present invention.

FIG. 9 is a sectional view of the underbody for vehicles according to the second preferred embodiment of the present invention.

FIG. 10 is an exploded perspective view of a first water tank according to a second preferred embodiment of the present invention.

FIG. 11 is a sectional view of an underbody for vehicles according to a third preferred embodiment of the present invention.

FIG. 12 is an exploded perspective view illustrating a coupling structure between a first water tank according to a third preferred embodiment of the present invention and a battery pack.

FIG. 13 is an exploded perspective view of the first water tank according to the third preferred embodiment of the present invention.

FIG. 14 is an exploded perspective view of an underbody for electric vehicles according to a fourth preferred embodiment of the present invention.

FIG. 15 is a sectional view of the underbody for electric vehicles according to the fourth preferred embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, an underbody for electric vehicles having a water tank according to the present invention will be described with reference to the accompanying drawings.

FIG. 2 is a perspective view of an underbody for vehicles according to a first preferred embodiment of the present invention, and FIG. 3 is an exploded perspective view of the underbody for vehicles according to the first preferred embodiment of the present invention. In addition, FIG. 4 is a sectional view taken along line A-A' of FIG. 2, and FIG. 5 is an exploded perspective view illustrating a coupling structure between a first water tank according to a first preferred embodiment of the present invention and a battery pack.

Referring to FIGS. 2 to 5, the underbody 100 for vehicles according to the first embodiment of the present invention is provided with a receiving portion 110 depressed by a predetermined depth in an upward direction, i.e. in a direction toward an indoor space of a vehicle, and a first water tank 120 and a battery pack 200 are mounted in the receiving portion 110.

Specifically, the first water tank 120 and the battery pack 200 are sequentially located in the receiving portion 110 of the underbody 100 for vehicles from above, and at least one of a first shock-absorbing pad 130 and a thermally conductive adhesive member 140 may be interposed between the first water tank 120 and the battery pack 200.

Here, the first water tank 120 may be a heat sink configured to dissipate heat generated in the battery pack 200, and it is preferable for the first water tank 120 to be integrally mounted to the underbody 100 for vehicles.

In general, a heat sink is mounted in a battery module or a battery pack in order to dissipate heat generated in a battery cell. In contrast, in the present invention, it is possible to mount or exchange only the battery module or the battery pack, since the first water tank 120, which performs the function of a heat sink, is integrally manufactured at the time of forming the underbody 100 for vehicles.

As a result, it is possible to omit a manufacturing process for mounting the heat sink to the underbody for vehicles, and furthermore it is possible to repair or replace the battery module, etc. without separation of the heat sink.

Meanwhile, a cover member 180 is located under the battery pack 200, and it is preferable for a second shock-absorbing pad 160 to be further provided between the battery pack 200 and the cover member 180.

When describing the above components in more detail, the first shock-absorbing pad 130, which is located between the first water tank 120 and the battery pack 200, and the second shock-absorbing pad 160, which is interposed between the battery pack 200 and the cover member 180, are configured to guide tight contact between the first water tank 120 and the battery pack 200 and between the battery pack 200 and the cover member 180 and to protect the battery pack 200 from external impact, and each of the shock-absorbing pads may be made of a material that has predetermined elasticity so as to be increased and decreased in volume, such as sponge.

The cover member 180, which has an approximately flat shape, is configured to open and close the receiving portion 110 formed in the underbody 100 for vehicles, and is fixed to a plurality of second fixing members 190 provided along an edge of an opening of the receiving portion 110 by screw fastening, etc.

The thermally conductive adhesive member 140 is located between the first water tank 120 and the battery pack 200 in order to fix the first water tank 120 and the battery pack 200 to each other and to allow easy heat exchange between the first water tank 120 and the battery pack 200.

Here, the material for the thermally conductive adhesive member 140 is not particularly restricted as long as the material exhibits thermal conductivity and heat resistance. As an example, the thermally conductive adhesive member may be made of at least one of curable grease and epoxy-based adhesive glue.

Although the first shock-absorbing pad 130 and the thermally conductive adhesive member 140 are shown as being simultaneously interposed between the first water tank 120 and the battery pack 200 in FIG. 5, only one thereof may be provided.

Meanwhile, the battery pack 200 is primarily fixed to the underbody 100 for vehicles. That is, a quadrangular or H-beam-shaped first fixing member 150 is provided at opposite edges of the underbody 100 for vehicles and in the middle of the receiving portion 110, and the battery pack 200 is coupled to the first fixing member 150 through a known fastening means, such as screw coupling.

Next, the battery pack 200 will be described. The battery pack 200, which is located under the first water tank 120 in a state of being mounted in the receiving portion 110 of the underbody 100 for vehicles, includes at least one battery module 210.

Specifically, the battery module 210 includes a module case 211 open at a part thereof and a plurality of battery cells 212 received in the module case 211.

The module case 211 includes a pair of side plates 211(*a*) located respectively at opposite sides of a battery cell stack configured to have a structure in which the several battery cells 212 are stacked side by side in a vertical or horizontal direction, at least one strap 211(*c*) configured to fix the pair of side plates 211(*a*) to each other, and a lower plate (not shown).

Here, it is preferable for the at least one strap 211(*c*) not to completely cover an upper surface of the module case 211. The reason for this is that it is necessary for air or liquid to easily pass through the interior of the module case 211.

At least one of the first shock-absorbing pad 130 and the thermally conductive adhesive member 140 is located at the strap 211(*c*) located at an upper side of the battery cell stack.

Each of the pair of side plates 211(*a*) is provided with a wing portion 211(*b*) protruding outwards by a predetermined length. The wing portion 211(*b*) is brought into contact with the first fixing member 150 provided at the underbody 100 for vehicles, and is fastened thereto using a known fastening means, such as a bolt, whereby the battery module 210 may be stably fixed in the receiving portion 110.

Each of the battery cells 212 includes a cell assembly, a cell case configured to receive the cell assembly, and a pair of leads.

Although a battery pack is shown as including four battery modules in FIGS. 3 and 5, this is merely an example and the number of battery modules may be changed without limit.

The cell assembly may be a jelly-roll type cell assembly, which is configured to have a structure in which a long sheet type positive electrode and a long sheet type negative electrode are wound in the state in which a separator is interposed therebetween, a stacked type cell assembly including unit cells, each of which is configured to have a structure in which a rectangular positive electrode and a rectangular negative electrode are stacked in the state in which a separator is interposed therebetween, a stacked and folded type cell assembly, which is configured to have a structure in which unit cells are wound using a long separation film, or a laminated and stacked type cell assembly, which is configured to have a structure in which unit cells are stacked in the state in which a separator is interposed therebetween and are then attached to each other. However, the present invention is not limited thereto.

The cell assembly is received in the cell case, and the cell case is generally configured to have a laminate sheet structure including an inner layer, a metal layer, and an outer layer. The inner layer is disposed in direct contact with the cell assembly, and therefore the inner layer must exhibit high insulation properties and high resistance to an electrolytic solution. In addition, the inner layer must exhibit high sealability in order to hermetically seal the cell case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and impact resistance, and excellent chemical resistance, is the most preferably used.

The metal layer, which is disposed so as to abut the inner layer, corresponds to a barrier layer configured to prevent moisture or various kinds of gas from permeating into the battery from the outside. An aluminum thin film, which is lightweight and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the cell assembly. As an example, the outer layer may be made of nylon or polyethylene terephthalate. However, the present invention is not limited thereto.

Meanwhile, the leads, which include a positive electrode lead and a negative electrode lead, are electrically connected to a positive electrode tab and a negative electrode tab of the cell assembly and are exposed outwards from the case. The battery cell corresponds to generally known constructions, and therefore a more detailed description thereof will be omitted.

FIG. 6 is an exploded perspective view of the first water tank according to the first preferred embodiment of the present invention. Referring to FIG. 6, the first water tank 120 according to the first preferred embodiment of the present invention includes an upper body 121 having a predetermined height and a lower body 122 coupled to a lower side of the upper body 121 to define a predetermined space necessary for water to circulate.

The water tank 120 may be provided with a water circulation channel. Although not shown in the figure, the water tank may be further provided with a water inlet introduction port and a water discharge port such that the water tank can be maintained at a predetermined temperature.

FIG. 7 is a perspective view of a modified battery module according to a first preferred embodiment of the present invention. As shown in FIG. 7, a module case 211 of the modified battery module 210 includes a pair of side plates 211(a) located at opposite sides of a battery cell stack constituted by battery cells 212, a wing portion 211(b) protruding outwards from each of the pair of side plates 211(a) by a predetermined length, and an upper plate 211(d) and a lower surface (not shown) configured to connect the pair of side plates 211(a) to each other.

At this time, it is preferable for one or more through-holes 211' spaced apart from each other by a predetermined distance to be formed in the upper plate 211(d) such that air or liquid can easily pass through the interior of the module case 211.

FIG. 8 is an exploded perspective view of an underbody for vehicles according to a second preferred embodiment of the present invention, FIG. 9 is a sectional view of the underbody for vehicles according to the second preferred embodiment of the present invention, and FIG. 10 is an exploded perspective view of a first water tank according to a second preferred embodiment of the present invention.

The underbody 100 for vehicles according to the second preferred embodiment of the present invention is identical in construction to the underbody 100 for vehicles according to the first preferred embodiment of the present invention described with reference to FIGS. 2 to 7 except for the first water tank, and therefore a description of the same construction will be omitted.

The first water tank 120 according to the second preferred embodiment of the present invention includes an upper body 121 having a predetermined height and a lower body 122 coupled to a lower side of the upper body 121 to define a predetermined space necessary for water to circulate.

Here, the lower body 122 is provided with at least one bar-shaped through-hole 122', and a sealing member 123, which is made of a material that is melted or broken when heated to a predetermined temperature, for example a resin having a melting point of 200° C. or lower, such as polyethylene or polypropylene, is mounted in the through-hole 122'.

When the sealing member 123 is provided at a predetermined region of the lower body 122 of the first water tank 120, as in the second embodiment, the sealing member performs the function of a heat sink during normal operation of the battery pack. However, when an event occurs in a specific battery cell, for example when a high-temperature gas is generated in the battery cell, sparks are generated in the battery cell, or fire breaks out in the battery cell, the sealing member 123 is melted or broken. At this time, water in the first water tank 120 is directly introduced into the battery module or the battery pack through the through-hole 122', whereby it is possible to prevent secondary damage, such as explosion.

FIG. 11 is a sectional view of an underbody for vehicles according to a third preferred embodiment of the present invention, FIG. 12 is an exploded perspective view illustrating a coupling structure between a first water tank according to a third preferred embodiment of the present invention and a battery pack, and FIG. 13 is an exploded perspective view of the first water tank according to the third preferred embodiment of the present invention.

The underbody 100 for vehicles according to the third preferred embodiment of the present invention is identical in construction to the underbody for vehicles described with reference to FIGS. 8 to 10 except for the first water tank 120 according to the second embodiment.

That is, the first water tank 120 according to the second embodiment is configured such that the channel is provided in the upper body 121, whereas the upper body 121 may be provided with no channel in the third embodiment.

FIG. 14 is an exploded perspective view of an underbody for electric vehicles according to a fourth preferred embodiment of the present invention, and FIG. 15 is a sectional view of the underbody for electric vehicles according to the fourth preferred embodiment of the present invention.

The underbody 100 for electric vehicles according to the fourth preferred embodiment of the present invention further includes a second water tank 170 disposed between the first water tank 120 and the cover member 180 according to the second embodiment or the third embodiment described with reference to FIGS. 8 to 12.

At this time, it is preferable for the second water tank 170 to be a heat sink, and it is more preferable for the first water tank 120 to be a tank for fire extinguishment and for the second water tank 170 to perform the function of a heat sink.

Here, the second water tank 170, functions as a heat sink, includes an upper body and a lower body, as shown in FIG. 6, and it is preferable for a channel to be formed in each body.

Meanwhile, at least one of a thermally conductive adhesive member 140 and a second shock-absorbing pad 160 may be interposed between the battery pack 200 and the second water tank 170. The thermally conductive adhesive member 140 is the same as above, and the second shock-absorbing pad 160 is identical in construction and function to the first shock-absorbing pad 130, and therefore a duplicate description thereof will be omitted.

The present invention may provide an electric vehicle including the underbody 100 for vehicles.

Meanwhile, in the present invention, the electric vehicle means a transportation means configured to move through a reaction caused by friction between wheels connected to a vehicle body so as to be driven using power including electricity and the surface of a road, and may encompass all vehicles each having an underbody and capable of being driven by electricity, such as a passenger car, a van, a truck, and a special car, including a tractor and a cultivator.

Those skilled in the art to which the present invention pertains will appreciate that various applications and modifications are possible within the category of the present invention based on the above description.

DESCRIPTION OF REFERENCE SYMBOLS

100: Underbody for vehicles
110: Receiving portion
120: First water tank
121: Upper body
122: Lower body 122': Through-hole
123: Sealing member
130: First shock-absorbing pad
140: Thermally conductive adhesive member
150: First fixing member
160: Second shock-absorbing pad
170: Second water tank
180: Cover member
190: Second fixing member
200: Battery pack
210: Battery module
211: Module case
211(a): Side plate 211(b): Wing portion
211(c): Strap 211(d): Upper plate
211': Through-hole
212: Battery cell

The invention claimed is:

1. An underbody for electric vehicles, the underbody comprising:
   a receiving portion depressed upwards by a predetermined depth, the receiving portion being configured to receive a battery pack,
   wherein a first water tank is mounted in an upper part of the receiving portion,
   wherein the first water tank comprises an upper body, a lower body provided with a through-hole having a predetermined shape, and a sealing member provided in the through-hole and in direct contact with the lower body, and
   wherein the sealing member includes a material configured to be melted or broken when heated to a predetermined temperature.

2. The underbody according to claim 1, wherein the first water tank is integrally mounted to the underbody.

3. The underbody according to claim 2, wherein the battery pack comprising at least one battery module is located under the first water tank.

4. The underbody according to claim 3, wherein the at least one battery module comprises a module case and at least one battery cell, and
   wherein the module case has a shape in which a part of the module case is open.

5. The underbody according to claim 4, wherein the module case comprises a pair of side plates located respectively at opposite sides of a battery cell stack constituted by the at least one battery cell and at least one strap configured to fix the pair of side plates to each other, and
   wherein each of the pair of side plates is provided with a wing portion configured to be fixed to a predetermined region of the underbody by bolting or welding.

6. The underbody according to claim 4, wherein the module case comprises a pair of side plates located respectively at opposite sides of a battery cell stack constituted by the at least one battery cell, and a lower plate and an upper plate configured to connect the pair of side plates to each other,
   wherein each of the pair of side plates is provided with a wing portion configured to be fixed to a predetermined region of the underbody by bolting or welding, and
   wherein the upper plate is provided with at least one through-hole.

7. The underbody according to claim 3, wherein a thermally conductive adhesive member is located between the first water tank and the battery pack.

8. The underbody according to claim 3, wherein a first shock-absorbing pad is located between the first water tank and the battery pack.

9. The underbody according to claim 3, further comprising a cover member configured to open or close the receiving portion.

10. The underbody according to claim 9, wherein a second water tank is located between the battery pack and the cover member.

11. The underbody according to claim 10, wherein a thermally conductive adhesive member is located between the battery pack and the second water tank.

12. The underbody according to claim 11, wherein the second water tank is a heat sink.

13. The underbody according to claim 1, wherein the first water tank is a heat sink.

14. The underbody according to claim 3, wherein the first water tank is between the at least one battery module and the receiving portion, and is configured to introduce water directly to the at least one battery module when a fire breaks out in at least one battery cell of the at least one battery module.

15. The underbody according to claim 1, wherein the through-hole is provided in plural, and
   wherein the plurality of through-holes have different sizes.

16. An electric vehicle comprising the underbody according to claim 1.

* * * * *